UNITED STATES PATENT OFFICE 2,432,460

RESINOUS POLYMERS OF 1-ACYLOXY-1,3-BUTADIENES

Cornelius C. Unruh and William O. Kenyon, Rochester, N. Y., assignors to Eastman Kodak Company, Rochester, N. Y., a corporation of New Jersey No Drawing. Application January 21, 1944, Serial No. 519,204

4 Claims. (Cl. 260—66)

This invention relates to resinous polymers of 1-acyloxy-1,3-butadienes and to a process for the preparation thereof.

1-acyloxy-1,3-butadienes of the formula:

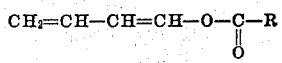

wherein R represents an organic radical, e. g. alkyl, aralkyl, aryl, etc., can be prepared by reacting crotonaldehyde with a carboxylic anhydride, in the presence of anhydrous alkali metal carboxylates. These compounds are reported to show the additive capacity which is the property of the simple and in particular the double unsaturated compounds, both with reference to other substances and to themselves.

We have now found that 1-acyloxy-1,3-butadienes can be polymerized to give resinous homopolymers. Surprisingly, the compounds cannot be copolymerized with substances such as methallyl alcohol, methallyl acetate, methallyl ethyl ether and vinyl acetate, to give resinous copolymers. On the other hand, we have found that 1-acyloxy-1,3-butadienes can be copolymerized with unsaturated organic compounds containing the

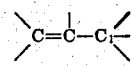

group in which the carbon atom $C_1$ is doubly or trebly bound to another atom. Our resinous polymers are useful for molding compositions, for the production of sheet or films, for lacquers and may be spun into filaments.

It is, accordingly, an object of our invention to provide resinous polymers. A further object is to provide a process for preparing resinous polymers. Other objects will become apparent hereinafter.

In accordance with our invention, we prepare resinous polymers by polymerizing a 1-acyloxy-1,3-butadiene alone or in admixture with another unsaturated organic compound containing the

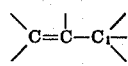

group in which the carbon atom $C_1$ is at least doubly bound to another atom, such as carbon, oxygen or nitrogen. Exemplary of the unsaturated organic compounds which can be copolymerized with the 1-acyloxy-1,3-butadienes are acrylic and α-methacrylic acids and their esters, maleic anhydride, alkyl vinyl ketones, styrene, 1,3-butadienes, acrylonitrile or α-methacrylonitrile. The homopolymerization and the copolymerizations are advantageously carried out in the presence of a polymerization catalyst. Polymerization catalysts, such as organic peroxides, e. g. benzoyl peroxide, acetyl peroxide or lauroyl peroxide are advantageously employed. Hydrogen peroxide, alkali metal perborates or alkali metal persulfates can also be used. The polymerizations are accelerated by heat.

The polymerizations can be effected with or without a diluent. The diluent, if employed, is advantageously a solvent for the polymer. The monomer (or mixture of monomers) can also be emulsified in a liquid in which they are insoluble (e. g. water) and the emulsion subjected to polymerization.

More than one unsaturated organic compound can be copolymerized with a single 1-acyloxy-1,3-butadiene and a plurality of 1-acyloxy-1,3-butadienes can be copolymerized together or with one or more other unsaturated organic compounds.

The following examples will serve to illustrate our new polymers and the manner of obtaining the same.

*Example 1.—Homopolymer of 1-acetoxy-1,3-butadiene*

11.2 g. (0.1 mole) of 1-acetoxy-1,3-butadiene were sealed in a glass tube. The sealed tube was heated at 50° C. for 19 days. The resulting white, opaque, rubbery homopolymer was insoluble in most organic solvents and was found to contain an acetyl group content of 36.2 per cent by weight. With 0.1 g. of benzoyl peroxide catalyst and 19 days heating at 50° C., the same results were obtained. With 0.15 g. of benzoyl peroxide catalyst and 54 days standing at 20° to 25° C., the same results were obtained. With no catalyst, at 20° to 25° C., a soft, gummy, light-brown polymer was obtained. It was soluble in acetone.

*Example 2.—Copolymer of 1-acetoxy-1,3-butadiene and maleic anhydride*

11.2 g. (0.1 mole) of 1-acetoxy-1,3-butadiene, 9.8 g. (0.1 mole) of maleic anhydride and 0.02 g. of benzoyl peroxide were sealed in a glass tube. The glass tube was heated in a steam bath for 3 days. The resulting copolymer was dissolved in acetone and the acetone solution poured into water to precipitate the copolymer as a light brown, fibrous resinous substance. The copolymer contained 18.5 per cent by weight of acetyl and a carboxyl group content of between 38 and 41 per cent by weight. Using 0.105 g. of benzoyl peroxide catalyst and heating for 2 days at 100° C., a light-brown copolymer was obtained which was soluble in acetone and in 1,4-dioxane.

Example 3.—Copolymer of styrene and 1-acetoxy-1,3-butadiene 11.2 g. (0.1 mole) of 1-acetoxy-1,3-butadiene, 10.4 g. (0.1 mole) of styrene and 0.108 g. of benzoyl peroxide were sealed in a glass tube. The glass tube was heated at 50° C. for 19 days. The resulting copolymer was dissolved in acetone and the acetone solution poured into water to precipitate the copolymer as a white, fibrous resinous substance. The copolymer contained 2.3 per cent by weight of acetyl. A copolymer prepared in exactly the same manner, except that heating was continued for 25 days, contained an acetyl group content of 5.6 per cent by weight.

Example 4.—Copolymer of methyl-α-methacrylate and 1-acetoxy-1,3-butadiene 11.2 g. (0.1 mole) of 1-acetoxy-1,3-butadiene, 10 g. (0.1 mole) of methyl α-methacrylate and 0.106 g. of benzoyl peroxide were sealed in a glass tube. The glass tube was heated at 50° C. for 19 days. The resulting copolymer was white, slightly rubbery and soluble in acetone. It contained an acetyl group content of 20 per cent by weight. A copolymer prepared in exactly the same manner, except that heating was continued for 25 days, was white, slightly soft and soluble in acetone. It contained an acetyl group content of 21.8 per cent by weight.

Example 5.—Copolymer of methyl acrylate and 1-acetoxy-1,3-butadiene 11.2 g. (0.1 mole) of 1-acetoxy-1,3-butadiene, 8.6 g. (0.1 mole) of methyl acrylate and 0.1 g. of benzoyl peroxide were sealed in a glass tube. The glass tube was heated at 50° C. for 19 days. The resulting copolymer contained an acetyl group content of 15.1 per cent by weight.

Example 6.—Copolymer of acrylic acid and 1-acetoxy-1,3-butadiene 11.2 g. (0.1 mole) of 1-acetoxy-1,3-butadiene, 7.2 g. (0.1 mole) of acrylic acid and 0.09 g. of benzoyl peroxide were sealed in a glass tube. The sealed tube was heated at 50° C. for 20 days. The resulting soft, white copolymer was soluble in acetone.

Example 7.—Copolymer of α-methacrylic acid and 1-acetoxy-1,3-butadiene 11.2 g. (0.1 mole) of 1-acetoxy-1,3-butadiene, 8.6 g. (0.1 mole) of α-methacrylic acid and 0.1 g. of benzoyl peroxide were sealed in a glass tube. The glass tube was heated at 50° C. for 17 days. The resulting slightly yellow copolymer was soluble in mixtures of acetone and water. The copolymer contained an acetyl group content of 20.1 per cent by weight.

Example 8.—Copolymer of methyl isopropenyl ketone and 1-acetoxy-1,3-butadiene 11.2 g. (0.1 mole) of 1-acetoxy-1,3-butadiene, 8.4 g. (0.1 mole) of methyl isopropenyl ketone and 0.1 g. of benzoyl peroxide were sealed in a glass tube. The glass sealed tube was heated at 50° C. for 54 days. The resulting copolymer was white, tough and soluble in acetone. It contained an acetyl group content of 14.8 per cent by weight. A similar copolymer prepared exactly as above, except that heating was continued for 25 days was white, slightly soft and soluble in acetone. This latter copolymer contained an acetyl group content of 18.5 per cent by weight.

Example 9.—Copolymer of maleic anhydride and 1-propionoxy-1,3-butadiene 12.6 g. (0.1 mole) of 1-propionoxy-1,3-butadiene, 9.8 g. (0.1 mole) of maleic anhydride and 0.022 g. of benzoyl peroxide were dissolved in 50 cc. of acetone. The resulting solution was heated under reflux on the steam bath. Considerable viscosity developed after about 12 hours with some yellow coloration. The resulting viscous solution was diluted with acetone and the acetone solution poured into benzene to precipitate the copolymer. The copolymer was redissolved in acetone and again precipitated into benzene. The precipitated copolymer was dissolved the third time in acetone and this time precipitated into diethyl ether. The precipitated copolymer was then leached in fresh diethyl ether and finally dried at 60° C. The copolymer contained a propionyl group content of between 24.5 and 26 per cent by weight.

Example 10.—Copolymer of methyl-α-methacrylate and 1-propionoxy-1,3-butadiene 12.6 g. (0.1 mole) of 1-propionoxy-1,3-butadiene, 10 g. (0.1 mole) of methyl α-methacrylate and 0.113 g. of benzoyl peroxide were sealed in a glass tube. The glass tube was heated at 50° C. for 17 days. The resulting clear rubbery copolymer was dissolved in acetone. The acetone solution was filtered and then poured into ethyl alcohol to precipitate the copolymer. The precipitated copolymer was then washed three times with fresh alcohol and then dried in vacuo at 40° to 45° C. The copolymer contained a propionyl group content of about 15 per cent by weight. Heating at 100° C. instead of 50° C. yielded a copolymer containing a propionyl group content of about 8.5 per cent by weight.

Example 11.—Copolymer of methyl acrylate and 1-propionoxy-1,3-butadiene 12.6 g. (0.1 mole) of 1-propionoxy-1,3-butadiene, 8.6 g. (0.1 mole) of methyl acrylate and 0.1 g. of benzoyl peroxide were sealed in a glass tube. The sealed tube was heated in a bath at 50° C. After about 4 days a white, fluffy copolymer was obtained. This copolymer was washed several times in acetone. It was found to contain a propionyl group content of about 8.5 per cent by weight.

Example 12.—Copolymer of diethyl fumarate and 1-propionoxy-1,3-butadiene 12.6 g. (0.1 mole) of 1-propionoxy-1,3-butadiene, 17.2 g. (0.1 mole) of diethyl fumarate and 0.15 g. of benzoyl peroxide were sealed in a glass tube. The glass tube was heated at 50° C. for 17 days. The resulting soft, straw-yellow copolymer was dissolved in acetone. The solution was filtered and poured into a liquid consisting essentially of low boiling hydrocarbons to precipitate the copolymer. The precipitated copolymer was washed with several changes of low boiling hydrocarbons and finally dried at 50° C. in vacuo. The copolymer was found to contain a carbon content of 61.23 per cent by weight and a hydrogen content of 7.4 per cent by weight.

Example 13.—Copolymer of maleic anhydride and 1-isobutyroxy-1,3-butadiene 10 g. of 1-isobutyroxy-1,3-butadiene were mixed with 40 cc. of acetone and 7 g. of maleic anhydride. 0.017 g. of benzoyl peroxide was added to the solution and the resulting mixture was heated under reflux on the steam bath, for about 12 hours. The reaction mixture was then diluted with acetone and poured into benzene to precipitate the copolymer. Solution in acetone and precipitation in benzene was repeated. The precipitated copolymer was then again dissolved in acetone and precipitated in diethyl ether. The precipitated copolymer was leached for several hours in fresh diethyl ether and ultimately dried at 60° C. The copolymer was found to contain an isobutyryl content of 27.1 per cent by weight.

*Example 14.—Copolymer of methyl α-methacrylate and 1-isobutyroxy-1,3-butadiene*

10 g. of 1-isobutyroxy-1,3-butadiene, 7.1 g. of methyl α-methacrylate and 0.086 g. of benzoyl peroxide were sealed in a glass tube. The sealed tube was heated at 50° C. for 17 days. The slightly yellow rubbery copolymer was dissolved in acetone. The acetone solution was filtered and poured into ethyl alcohol to precipitate the copolymer. The precipitated copolymer was washed three times with fresh ethyl alcohol and then dried in vacuo at 40° to 45° C. The copolymer contained an isobutyryl content of about 4.4 per cent by weight.

*Example 15.—Copolymer of acrylonitrile and 1-acetoxy-1,3-butadiene*

11.2 g. of 1-acetoxy butadiene 1,3; 5.3 g. of acrylonitrile; and 0.083 g. of benzoyl peroxide were sealed together in a glass tube and set in a 50° C. bath. After eight days the tube was opened and the product consisted of a slightly yellow, clear mass exhibiting no cold flow. It was very tough and rubberlike and appeared to be insoluble in organic solvents. Furthermore, it showed great tendency to adhere to the glass vessel. The product was purified by leaching in several changes of acetone and finally drying in a vacuum oven at 50° C. It was found to contain 6.13 per cent by weight of nitrogen.

As pointed out above, the 1-acyloxy-1,3-butadienes can be prepared by reacting crotonaldehyde with a carboxylic anhydride in the presence of anhydrous alkali metal carboxylates. 1-acetoxy-1,3-butadiene is specifically described in U. S. Patent 2,215,180, dated September 17, 1940. The following examples will serve to illustrate further the preparation of 1-acyloxy-1,3-butadienes.

*Example 16.—1-propionoxy-1,3-butadiene*

300 g. of freshly used sodium propionate, 750 g. of propionic anhydride and 360 g. of crotonaldehyde were refluxed together for 2½ hours. The product was poured into water, the oily layer separated, washed thoroughly with sodium bicarbonate solution and then with water, and dried over anhydrous magnesium sulfate. The product was then distilled under diminished pressure, the fraction distilling at 59.8 to 60.5 at 23 mm. of mercury pressure being the propionoxy derivative.

*Example 17.—1-isobutyroxy-1,3-butadiene*

120 g. of sodium isobutyrate (dried by fusion), 120 g. of crotonaldehyde and 290 g. of isobutyric anhydride were heated in an oil bath at 130°–135° C. for 3 hours. The mixture was under reflux and continuously stirred. The product was poured into water and the resulting oil washed thoroughly with sodium bicarbonate solution and then with water, and dried with anhydrous magnesium sulfate. It was distilled under diminished pressure and the portion distilling at 65.8° to 66.5° C. under 23 mm. of mercury pressure being the isobutyroxy derivative.

What we claim as our invention and desire to be secured by Letters Patent of the United States is:

1. The resinous copolymer obtained by polymerizing equimolecular proportions of 1-acetoxy-1,3-butadiene and methyl isopropenyl ketone.

2. A process for preparing a resinous copolymer comprising polymerizing a mixture of equimolecular proportions of 1-acetoxy-1,3-butadiene and methyl isopropenyl ketone, in the presence of polymerization catalyst consisting of benzoyl peroxide.

3. The resinous copolymer obtained by polymerizing equimolecular proportions of methyl isopropenyl ketone and an 1-acyloxy-1,3-butadiene wherein the acyloxy group is an acyloxy group of the acetic acid series containing from 2 to 4 carbon atoms.

4. A process for preparing a resinous copolymer comprising polymerizing a mixture of equimolecular proportions of methyl isopropenyl ketone and a 1-acyloxy-1,3-butadiene wherein the acyloxy group is an acyloxy group containing from 2 to 4 carbon atoms, in the presence of a polymerization catalyst consisting of benzoyl peroxide.

CORNELIUS C. UNRUH.
WILLIAM O. KENYON.

REFERENCES CITED

The following references are of record in the file of this patent:

UNITED STATES PATENTS

| Number | Name | Date |
|---|---|---|
| 1,963,108 | Werntz | June 19, 1934 |
| 2,215,180 | Kaufler | Sept. 17, 1940 |
| 2,344,085 | Halbig | Mar. 14, 1944 |
| 2,088,577 | Conaway | Aug. 3, 1937 |

FOREIGN PATENTS

| Number | Country | Date |
|---|---|---|
| 723,773 | Germany | June 25, 1942 |

OTHER REFERENCES

Klebanskii Senteticheske Kautchuk, vol. 4, No. 4, pages 5–13 (1935); Chem. Abst. 29, 6799 (1935).